UNITED STATES PATENT OFFICE.

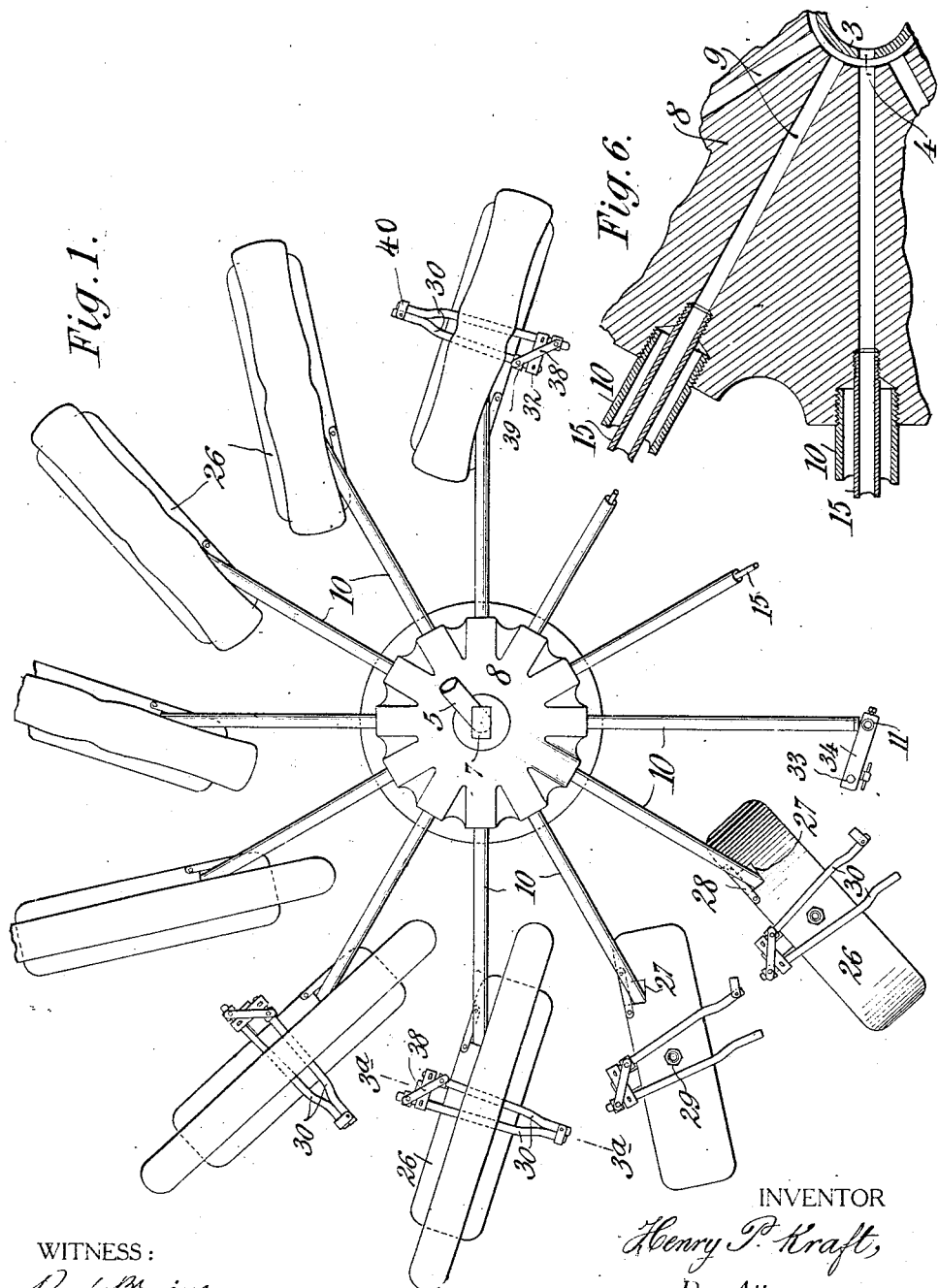

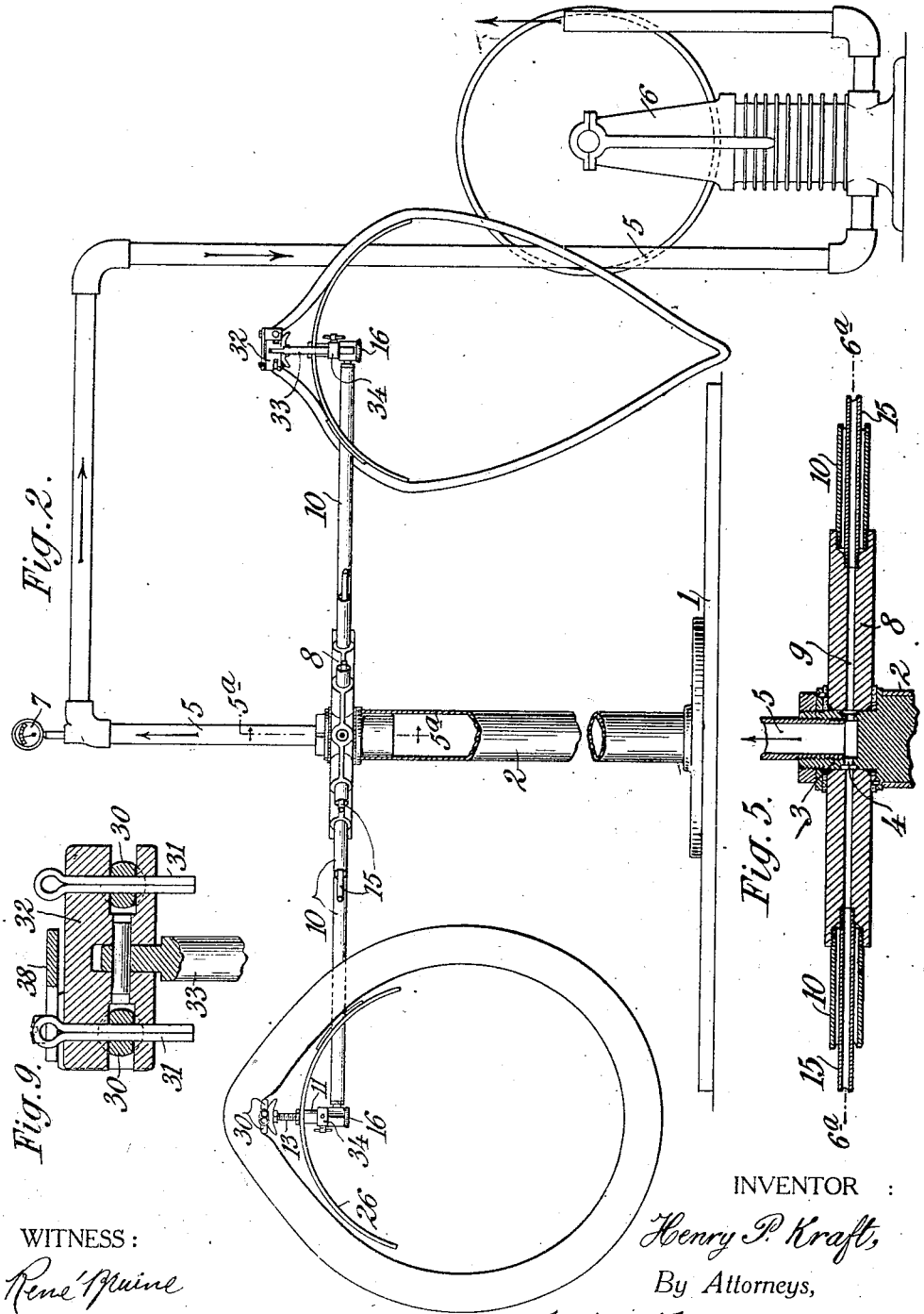

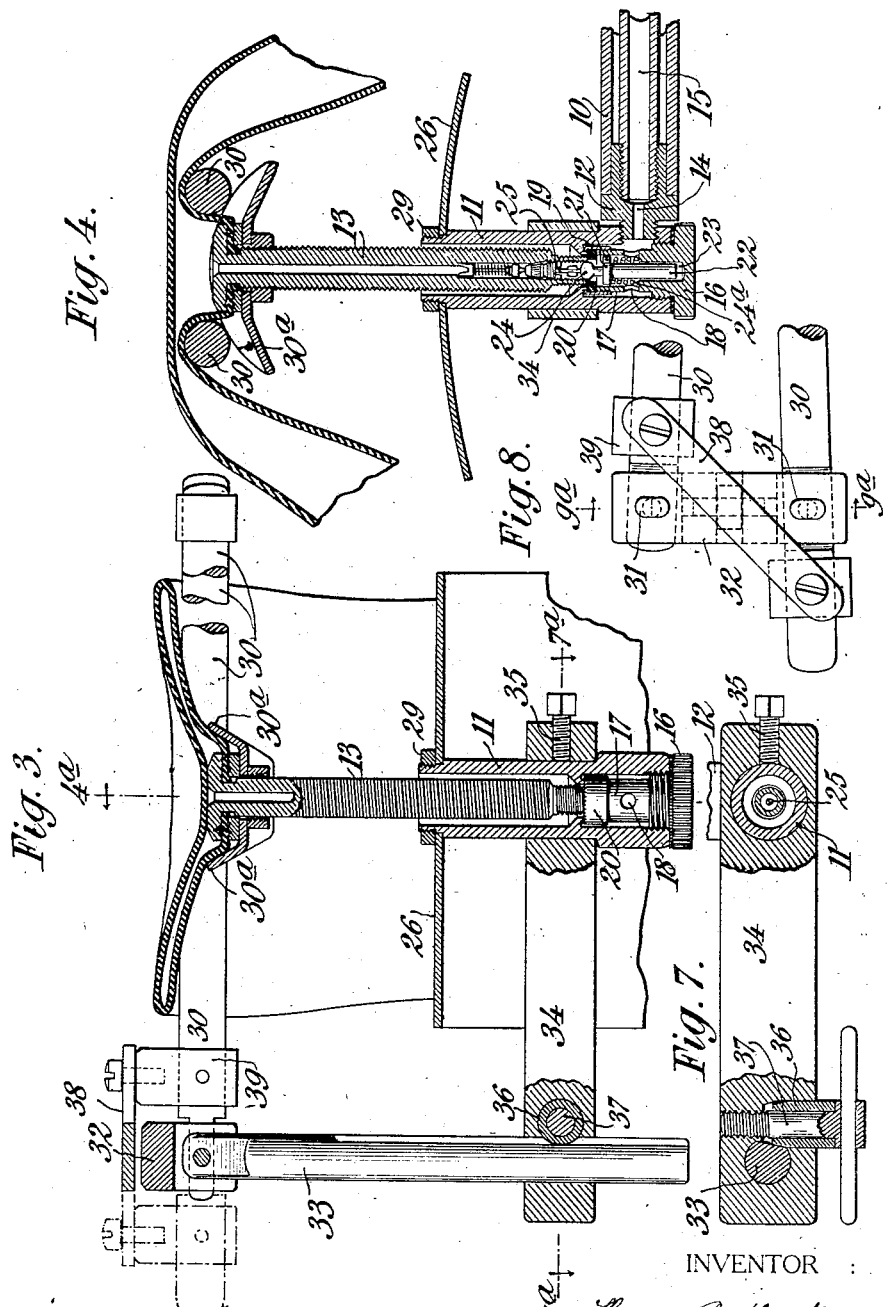

HENRY P. KRAFT, OF RIDGEWOOD, NEW JERSEY.

DEFLATING-MACHINE.

1,297,186.  Specification of Letters Patent.  Patented Mar. 11, 1919.

Application filed December 21, 1917. Serial No. 208,336.

*To all whom it may concern:*

Be it known that I, HENRY P. KRAFT, a citizen of the United States of America, residing in Ridgewood, in the county of Bergen and State of New Jersey, have invented certain new and useful Improvements in Deflating-Machines, of which the following is a specification.

My invention relates to deflating machines for pneumatic tires, and has for one of its chief purposes to provide mechanism that will insure exhausting all air from a tire after it has been tested and is ready to be packed for marketing.

In a more specific aspect, the invention is intended to provide for holding the walls of the tire separated at the point where the air is exhausted, until there is a substantial vacuum within the tire.

Another object of the improvement is to afford a machine that will handle a number of tires at one time and requires only the preliminary positioning of the tire, which can be done by one operator while a second operator is engaged in continuously removing the tires after they are deflated.

A further purpose is to provide a practicable apparatus which can be easily controlled and operated, with provision for giving ample warning when sufficient deflation has taken place, thus enabling the operator to avoid subjecting the tire to excessive suction.

To these and other ends the invention consists in certain details and combinations of parts, as will be more fully described hereinafter and pointed out in the claims at the end of the specification.

In the drawings,—

Figure 1 is a plan view, with parts broken away, and showing a preferred form of the apparatus with several tires in operative position;

Fig. 2 is a side elevation, partially broken away, and showing parts in section;

Fig. 3 is an enlarged sectional view on the line $3^a$—$3^a$ of Fig. 1, and showing the position of the tire at the completion of the deflating operation;

Fig. 4 is a sectional view on the line $4^a$—$4^a$ of Fig. 3, and showing the position of the tire before the deflating operation is completed;

Fig. 5 is a sectional view on the line $5^a$—$5^a$ of Fig. 2;

Fig. 6 is a sectional view in a horizontal plane, on the line $6^a$—$6^a$ of Fig. 5.

Fig. 7 is a horizontal sectional view on line $7^a$—$7^a$ of Fig. 3;

Fig. 8 is an enlarged plan view of a portion of the spreading device shown in Fig. 3, and illustrating the connection between the arms thereof, and Fig. 9 is a sectional view on line $9^a$—$9^a$ of Fig. 8.

Similar reference characters throughout the several views indicate the same parts.

For a brief understanding of the invention, it may be stated that after a pneumatic tire is completed it is inflated to a certain pressure for testing. When the testing operation is completed it is desirable to remove all air from the tire before it is rolled or otherwise packed. This has heretofore been done by hand, involving a long and more or less difficult operation, and the present apparatus accomplishes it by suction means, which can readily be connected with or removed from a tire, and automatically opens the tire valve when connected. The structure preferably comprises a movable carrier having a number of supports, each adapted to receive a tire. The carrier may be manually rotatable, and during such movement, the tires are subjected to the action of a common suction-producing means which is connected with the tires through the various supports. The suction is maintained on all the tires during rotation of the carrier, and when the operator is satisfied that the deflation of a particular tire is complete, it is removed and another takes its place. The machine can be controlled by two operators, one positioning the tires while the other removes them at different points of the carrier.

The invention is susceptible of practical embodiment in a variety of ways, and I have disclosed a preferred form, intended to be illustrative of one example only, and not as limiting the invention to any specific form or arrangement. In the present machine, 1 designates a base and 2 is a standard extending upwardly from the base and provided at its upper end with a hollow bearing 3. The latter has a lateral opening 4, the purpose of which will appear presently, while 5 is a pipe leading from the hollow bearing 3 to a suction pump 6. A pressure gage 7 is preferably connected with the pipe 5, to show the amount of suction exerted on the tires at any given moment.

Rotatively arranged upon the hollow bearing 3 is a carrier which includes a central frame 8 having a series of radial passages 9, continuously in communication with the passage 4 previously referred to, during rotation of the carrier. The central frame 8 carries a series of radial supporting arms 10, provided with connections which are readily detachable from the tires, and to this end at the outer end of each arm is attached a support 11 (see Fig. 4) by means of a coupling 12. For convenience of description I will refer to only one of the supports 11 and its connecting parts, as the remaining ones are duplicates in all respects.

The support 11 is hollow to receive a tire valve housing 13, and 14 is a passage in the coupling 12 which serves as a means of communication between the hollow support 11 and the pipe 15. The latter is arranged within the supporting arm 10 and connects the coupling 12 with the passage 9 in the central frame 8. 16 designates a removable container, preferably having a threaded engagement with the support 11, as shown in Fig. 4. The container 16 includes a barrel 17 having lateral openings 18, while 19 is a valve seat, preferably formed of rubber or similar material and held in place at the end of the barrel 17 by a threaded sleeve 20. 21 designates a suction valve coöperating with the seat 19 and mounted upon a valve stem 22 which reciprocates in an opening 23 formed in the container 16. The valve 21 is held against its seat normally by a spring 24ª. This arrangement may be varied in different respects without departing from the essential idea, my intention being to employ a valve container which is readily removable to permit replacing or repairing the valve seat and other parts of the suction valve mechanism.

The valve 21 carries a projecting portion 24, which is preferably flattened and engages the usual valve stem 25, which is found in the conventional form of tire valve housing and which, when moved inwardly of the housing permits the air in the tire to exhaust. When the valve housing 13 is inserted within the hollow support 11, the projecting portion 24 first engages the tire valve stem 25 and opens the tire valve, and immediately thereafter the projecting portion 24 engages the outer end of the valve housing 13 as the latter reaches its final position, shown in Fig. 4. This causes the valve 21 to move away from the seat 19 so that the air is free to pass out from the tire through the valve housing 13, into the barrel 17, through the passages 18 and 14, and thence to the common suction pipe. The valves just previously referred to are opened by the mere positioning of the tire and its valve housing on the hollow support, as shown in Figs. 2 to 4, inclusive, and air is exhausted from the tire as long as it remains upon its support, as the automatic valve-opening operation places the tire in continuous communication with the common suction means. A guard is preferably provided for each tire support, as designated by 26. The guard 26 extends downwardly on opposite sides of the hollow support and in curved relationship, so as to afford a rest for the body of the tire, as shown in Fig. 2, and prevent its folding together while on the machine. The guard 26 is preferably mounted on the supporting arm 10 which extends through an opening 27, as shown in Figs. 1 and 2. 28 is a retaining plate that is removably attached to the guard 26 and holds it engaged with the supporting arm 10. The guard 26 also has a central opening that engages over the upper end of the hollow support 11 (see Fig. 4) and is held in place by a nut 29.

I will now describe the part of my invention that has to do with separating the opposite walls of the tire at the point where air is exhausted until the desired vacuum is secured.

To this end I employ a spreading device which preferably comprises a pair of arms 30 that are pivotally mounted for lateral swinging movement toward and from each other about the pins 31 (see Fig. 9). 32 designates a block upon which the pins 31 are arranged, said block being pivoted upon a standard 33 and forming therewith a holder for the spreading device. The standard 33 is adjustably mounted in an arm 34 which is attached to the aforementioned hollow support 11 by a set-screw 35. The standard 33 is adjustable vertically in the arm 34 and is held in adjusted position by a wedge sleeve 36 that is secured in place by an adjustable screw 37, extending through the sleeve and engaging the arm 34, as shown in Fig. 7. The arms 30 of the spreading device are connected by a link 38, pivotally attached to blocks 39 arranged upon opposite sides of the line of the pivotal axes of said arms. The effect of this arrangement is to cause the arms 30 to move simultaneously in opposite directions when either is operated. This facilitates control of the mechanism, as the operator can bring the arms into proper relationship with the tire by moving only one of them. The arms 30 of the spreading device are inserted between the tire and the opposite portions of the usual curved follower 30ª which is secured on the valve housing against the tire so that the body of the tire is elevated a substantial distance above the innermost end of the housing 13 and the air passage therein, as shown in Fig. 4. If the tire is not provided with a follower, such as designated by 30ª, suitable provision may be made for holding the valve housing, so as to permit sufficient separation from it of the opposite tire wall. Thus the walls of the tire are maintained in separated relation at the point where suction takes place, and the portion of the tire wall opposite to the housing 13 will not be drawn against the latter until substantially all the air in the tire is exhausted, and then the tire assumes the position shown in Fig. 3. The operator thus has a visual indication, by the sucking in of the tire, that the deflating operation is completed. Removal of the tire closes the suction valve and the parts are ready to receive another tire. For tires of varying sizes and different lengths of valve housings, the holder for the spreading device can be elevated or lowered to the proper adjustment. The arms 30 are held engaged with a tire during the air-exhausting operation by a locking member, which preferably consists of loop 40, pivoted to one of the arms and engageable with the end of the other arm.

It will be understood that my invention is susceptible of modification, particularly as to the tire-spreading device and the automatic suction-valve-controlling mechanism, and it is the purpose of this application to cover any suction machine coming within the scope of the following claims and including a tire connection which automatically opens and closes the tire valve, and any device coöperating with a tire for maintaining the walls in such relation as to insure complete deflation.

What I claim is:

1. A deflating machine for pneumatic tires comprising a connection which receives a hollow valve housing, a suction pipe communicating with the tire through said connection, and instrumentalities arranged in the connection acting automatically to open the tire valve when the valve housing is applied.

2. A deflating machine for pneumatic tires comprising a hollow support which receives a hollow valve housing, and suction means communicating with the tire through said support.

3. A deflating machine for pneumatic tires comprising a connection which receives a hollow valve housing, suction means communicating with the tire through said connection, and a spreading device which coöperates with the tire and separates its walls at the innermost end of the valve housing until all the air is substantially exhausted.

4. A deflating machine for pneumatic tires comprising a movable carrier, a plurality of connections mounted on the carrier to receive the valve housings of separate tires, and common suction means communicating with the carrier and with the different connections.

5. A deflating machine for pneumatic tires comprising a rotatable carrier having a plurality of passages extending radially from the center, a plurality of connections mounted on the carrier to receive the valve housings of separate tires and communicating with said radial passages, and common suction means communicating with said passages.

6. A deflating machine for pneumatic tires comprising a connection which receives a hollow valve housing of a tire, a suction pipe communicating with the tire through the connection, and a suction valve arranged within the connection.

7. A deflating machine for pneumatic tires comprising a connection which receives a hollow valve housing, a suction pipe communicating with the tire through the connection, a valve seat in the connection, and a suction valve engaging said seat and acting initially when the valve housing is inserted to open the tire valve and subsequently to engage the valve housing and move away from said seat to permit the suction to act on the tire.

8. A deflating machine for pneumatic tires comprising a connection which receives a hollow valve housing, a suction pipe communicating with the tire through the connection, instrumentalities arranged in the connection acting automatically to open the tire valve when the valve housing is inserted, and a spreading device which engages the tire on opposite sides of the valve housing and separates its walls at the innermost end of the valve housing until all the air is substantially exhausted.

9. A deflating machine for pneumatic tires comprising a hollow support which receives a hollow valve housing, suction means communicating with the tire through said hollow support, and a spreading device comprising a pair of arms which are connected for simultaneous movement toward or from each other and are engageable with the tire on opposite sides of the valve housing acting to separate the walls of the tire at the innermost end of the valve housing until all the air is substantially exhausted.

10. A deflating machine for pneumatic tires comprising a hollow support which receives a hollow valve housing, suction means communicating with the tire through said hollow support, a holder adjustably arranged on the hollow support, a spreading device comprising a pair of arms pivoted on said holder and engageable with the tire on opposite sides of the valve housing acting to separate the walls of the tire at the innermost end of the valve housing until all the air is substantially exhausted, and a link connected to said arms on opposite sides of the line of their pivotal axes, whereby the arms move simultaneously in opposite directions.

11. A deflating machine for pneumatic tires comprising a rotatable carrier embodying a central frame having a plurality of radial passages, a plurality of radial hollow supporting arms carried by the frame, a connection mounted on each supporting arm to receive the valve housing of a tire, air-conducting tubes in the hollow supporting arms and leading from said central passages to the connections, a hollow bearing on which the carrier rotates and having a passage which communicates with the passages in said central frame, and a suction pipe leading to the hollow bearing.

12. A deflating machine for pneumatic tires comprising a rotatable carrier, a plurality of hollow supports mounted on the carrier to receive the valve housings of separate tires, each support including a valve seat, a suction valve engaging said seat to control the air pressure in the support and acting initially when the valve housing is inserted to open the tire valve and subsequently to engage the valve housing and move away from said seat, and common suction means communicating with the supports.

13. A deflating machine for pneumatic tires comprising a hollow support which receives a hollow valve housing, a guard member curved downwardly on opposite sides of the support to receive the body of the tire, and suction means communicating with the tire through said support.

14. A deflating machine for pneumatic tires comprising a hollow support which receives a hollow valve housing, suction means communicating with the tire through said hollow support, a spreading device comprising a pair of arms which are connected for simultaneous movement toward or from each other and are engageable with the tire on opposite sides of the valve housing acting to separate the walls of the tire at the innermost end of the valve housing until all the air is substantially exhausted, and a locking member coöperating with said arms and acting to hold them engaged with the tire while the air-exhausting operation takes place.

15. A deflating machine for pneumatic tires comprising a hollow support which receives a hollow valve housing, suction means communicating with the tire through said hollow support, a valve seat in the support, a suction valve engaging said seat, a spring acting to close said valve against atmospheric pressure, and a projection on the valve which engages said valve housing when it is inserted and opens the suction valve to permit air to be exhausted from the tire.

16. The combination with a support, of a removable container having engagement with the support and embodying a barrel provided with lateral openings, a valve seat removably secured to the barrel, a reciprocating valve arranged within said barrel and coöperating with the seat, and a spring housed within the barrel and acting to seat the valve.

17. A deflating machine for pneumatic tires comprising a hollow support which receives a hollow valve housing, suction means communicating with the tire through said hollow support, a removable container having engagement with the support and embodying a barrel provided with lateral openings, a valve seat removably secured to the barrel, a reciprocatory valve arranged within said barrel and coöperating with the seat, a projection on the valve which engages said valve housing when the latter is inserted and moves away from its seat, and a spring housed within the barrel acting to seat said valve.

18. The combination with a valve seat and valve acting thereagainst, of fluid pressure acting against one face of said valve and tending to move it away from the seat, and a spring acting against the opposite face of the valve and holding it closed against said pressure, the valve being opened upon application of a relatively slight force in addition to said fluid pressure, sufficiently to overcome the excess pressure of the spring over the fluid pressure.

In witness whereof I have hereunto signed my name.

HENRY P. KRAFT.